C. F. SCHELL, Jr.
Cake-Cutter.
No. 198,219. Patented Dec. 18, 1877.
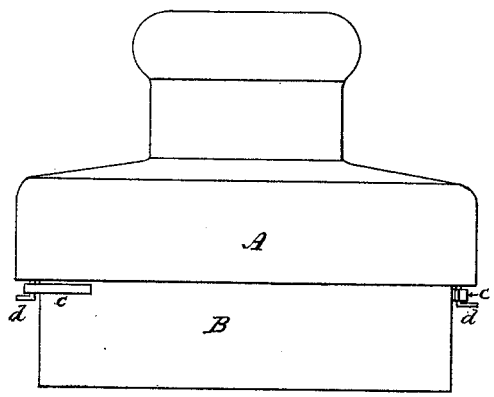
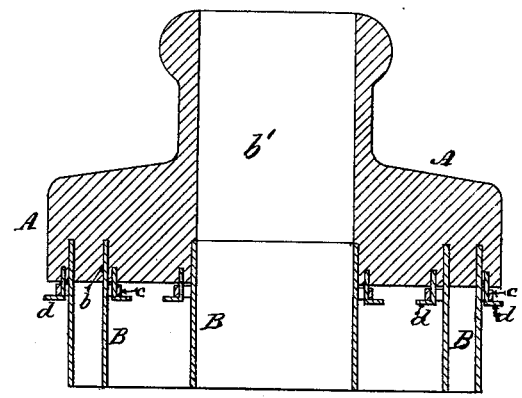
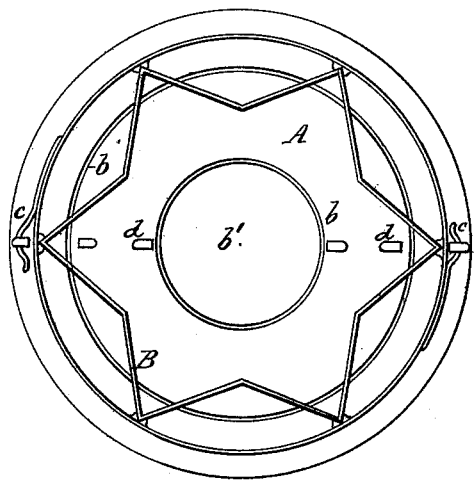
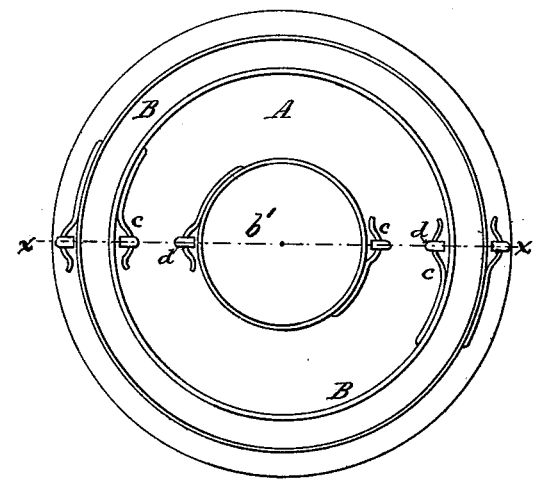

UNITED STATES PATENT OFFICE.

CHARLES F. SCHELL, JR., OF BUFFALO, NEW YORK, ASSIGNOR OF ONE-HALF HIS RIGHT TO MARY SCHNEIDER, OF SAME PLACE.

IMPROVEMENT IN CAKE-CUTTERS.

Specification forming part of Letters Patent No. 198,219, dated December 18, 1877; application filed November 10, 1877.

*To all whom it may concern:*

Be it known that I, CHARLES F. SCHELL, Jr., of the city of Buffalo, in the county of Erie and State of New York, have invented a new and useful Improvement in Cake-Cutters, of which the following is a specification, reference being had to the accompanying drawing.

My invention relates more especially to hand-cutters designed for family and bakers' use; and it consists in combining, with the handle or frame, a series of removable cutters, varying in size and design, and which can be adjusted to and from the handle when a particular form of cutter is required for use; and also in the construction of the several parts, as will be hereinafter more fully set forth.

In the accompanying drawing, Figure 1 represents a side elevation of my improved cake-cutter; Fig. 2, a sectional elevation in line $x\,x$ of Fig. 3; Fig. 3, a bottom-plan view, showing the manner of securing the cutters to the handle; and Fig. 4, a plan view, showing a cutter made in the form of a star.

Like letters of reference designate like parts in the several figures.

A represents the frame of a cake-cutter, the upper portion forming the handle. It is made of circular form, and provided on its bottom with two or more concentric grooves, $b$, and an opening, $b'$, extending centrally through the handle.

B are the cutters, secured in the grooves $b$ by means of suitable spring-loops, $c$, soldered or otherwise secured to the outer or inner periphery of the cutters B, and locking over hooks or lugs $d$, fastened to the bottom of the frame, as shown in Fig. 3 of the drawing. The cutters are thus held securely to the frame, and can be readily detached therefrom by a slight twist or turning movement of the cutter in the groove, when the springs disengage from the hooks $d$ and release the cutter, which can then be removed, and one of different design replaced.

The cutters can be made of any required design by bending the metal into the form desired. When any other than a circular form of cutter is required, the metal, after being bent into the desired pattern, is soldered at its edge or otherwise secured to a circular rim made to fit in the grooves in the bottom of the handle in the same manner as the cutters B. The central opening $b'$, extending through the handle, is of the same diameter as, or a little larger than, the small cutter B, and forms a passage for the dough when the cutter is employed in making doughnuts.

My improved cake-cutter is cheap in construction and forms a convenient and desirable article.

I claim as my invention—

1. The combination, with the frame or handle A, provided with central opening $b'$, of two or more concentric cutters, B, secured to the lower side of the frame, so as to be readily attached and detached, substantially as and for the purpose set forth.

2. The frame or handle A, provided with grooves $b$, in combination with the cutters B and spring-loops $c$, substantially as and for the purpose hereinbefore set forth.

Witness my hand this 3d day of November, 1877.

CHARLES F. SCHELL, JR.

Witnesses:
 JNO. J. BONNER,
 CHAS. J. BUCHHEIT.